(12) United States Patent
Zhu et al.

(10) Patent No.: US 9,405,519 B2
(45) Date of Patent: Aug. 2, 2016

(54) METHOD AND SYSTEM FOR REGISTER CLEARING IN DATA FLOW ANALYSIS IN DECOMPILATION

(71) Applicants: Electric Power Research Institute of State Grid Zhejiang Electric Power Company, Hangzhou, Zhejiang (CN); STATE GRID CORPORATION OF CHINA, Beijing (CN)

(72) Inventors: Jiong Zhu, Zhejiang (CN); Li Yao, Zhejiang (CN); Shaoteng Li, Zhejiang (CN); Yi Lou, Zhejiang (CN); Yingjun Hu, Zhejiang (CN); Xing Wu, Zhejiang (CN)

(73) Assignees: Electric Power Research Institute of State Grid Zhejiang Electric Power Company, Hangzhou, Zhejiang (CN); State Grid Corporation of China, Beijing (CN)

( * ) Notice: Subject to any disclaimer, the term of this patent is extended or adjusted under 35 U.S.C. 154(b) by 222 days.

(21) Appl. No.: 14/125,881
(22) PCT Filed: Nov. 23, 2012
(86) PCT No.: PCT/CN2012/085154
§ 371 (c)(1),
(2) Date: Dec. 12, 2013
(87) PCT Pub. No.: WO2014/023069
PCT Pub. Date: Feb. 13, 2014

(65) Prior Publication Data
US 2015/0212805 A1    Jul. 30, 2015

(30) Foreign Application Priority Data
Aug. 10, 2012 (CN) .......................... 2012 1 0283230

(51) Int. Cl.
*G06F 9/44* (2006.01)
*G06F 9/45* (2006.01)
*G06F 9/30* (2006.01)

(52) U.S. Cl.
CPC .............. *G06F 8/53* (2013.01); *G06F 9/30098* (2013.01); *G06F 9/44* (2013.01)

(58) Field of Classification Search
CPC ......... G06F 9/3098; G06F 9/44; G06F 8/427; G06F 8/53
See application file for complete search history.

(56) References Cited

U.S. PATENT DOCUMENTS

| 5,117,493 A | * | 5/1992 | Jensen | ................ G06F 9/30098 711/109 |
| 5,860,008 A | * | 1/1999 | Bradley | .................... G06F 8/53 717/137 |

(Continued)

FOREIGN PATENT DOCUMENTS

| CN | 1900910 A | 1/2007 |
| CN | 101561779 A | 10/2009 |

(Continued)

OTHER PUBLICATIONS

Cifuentes et al., "Computer Security Analysis through Decompilation and High-Level Debugging", [Online], IEEE 2001, pp. 375-380, [Retrieved from Internet on Mar. 24, 2016], <http://ieeexplore.ieee.org/stamp/stamp.jsp?tp=&arnumber=957846>.*

(Continued)

*Primary Examiner* — Thuy Dao
*Assistant Examiner* — Ziaul A Chowdhury
(74) *Attorney, Agent, or Firm* — Faegre Baker Daniels LLP

(57) ABSTRACT

A method and a system for register clearing in data flow analysis in decompilation are provided. The method includes: reading all function statements in a code file; sequentially judging each of the read function statements, and creating a binary tree and inputting the function statement into the binary tree in a case that the function statement includes a register name; sequentially judging each of the function statements including the register name, and performing an elimination process on the created binary tree to remove the register name from the binary tree in a case that the function statement includes a right child end tag of the binary tree, to generate a simplest binary tree; and generating a function statement in high-level language based on the simplest binary tree. All function statements can be read at a time and multiple reading and writing are avoided in the invention. In addition, a binary tree is created based on the read function statement and an elimination process is performed on the binary tree, so the function statement not including the register name can be obtained conveniently and quickly, which improves the execution efficiency.

11 Claims, 8 Drawing Sheets

(56) References Cited

U.S. PATENT DOCUMENTS

| | | | | |
|---|---|---|---|---|
| 5,926,639 | A * | 7/1999 | Richardson | G06F 8/433 714/E11.209 |
| 6,516,319 | B1 * | 2/2003 | Benayoun | G06F 17/3061 |
| 6,718,429 | B1 * | 4/2004 | Theis | G06F 9/30098 711/101 |
| 7,765,539 | B1 * | 7/2010 | Elliott | G06F 8/53 717/145 |
| 8,584,109 | B2 * | 11/2013 | Anckaert | G06F 21/53 712/226 |
| 8,607,193 | B2 * | 12/2013 | Avrahami | G06F 9/44 717/100 |
| 2004/0111713 | A1 * | 6/2004 | Rioux | G06F 8/427 717/137 |
| 2004/0186981 | A1 * | 9/2004 | Christie | G06F 9/30036 712/210 |
| 2006/0130016 | A1 * | 6/2006 | Wagner | G06F 9/4812 717/136 |
| 2006/0161888 | A1 * | 7/2006 | Lovisa | G06F 8/36 717/107 |
| 2006/0253841 | A1 * | 11/2006 | Rioux | G06F 8/427 717/127 |
| 2009/0254891 | A1 * | 10/2009 | Cui | G06F 8/53 717/138 |
| 2010/0299657 | A1 * | 11/2010 | Barua | G06F 8/53 717/136 |
| 2013/0227636 | A1 * | 8/2013 | Bettini | H04W 4/001 726/1 |
| 2013/0227693 | A1 * | 8/2013 | Dewey | G06F 9/44 726/25 |
| 2015/0113251 | A1 * | 4/2015 | Jian | G06F 9/30098 712/214 |

FOREIGN PATENT DOCUMENTS

| | | |
|---|---|---|
| CN | 101751334 A | 6/2010 |
| CN | 101963898 A | 2/2011 |

OTHER PUBLICATIONS

Ramsey et al., "A Transformational Approach to Binary Translation of Delayed Branches", [Online], ACM 2003, pp. 210-224, [Retrieved from Internet on Mar. 24, 2016], <http://delivery.acm.org/10.1145/650000/641890/p210-ramsey.pdf>.*

Cifuentes et al., "Decompilation of Binary Programs", [Online] 1995, pp. 811-829 [Retrieved from Internet on Mar. 24, 2016], <http://onlinelibrary.wiley.com/doi/10.1002/spe.4380250706/pdf>.*

Susanta Nanda et al., "BIRD: Binary Interpretation using Runtime Disassembly", [Online], IEEE 2006, pp. 1-12, [Retrieved from Internet on Mar. 24, 2016], <http://ieeexplore.ieee.org/stamp/stamp.jsp?tp=&arnumber=1611554>.*

International Search Report and Written Opinion (in Chinese language) issued by the State Intellectual Property Office of the P.R. China, dated May 3, 2013, for related International Application No. PCT/CN2012/085154; 10 pages.

* cited by examiner

```
int a = 1 ;
eax = int a ;
eax = eax + int a ;
eax = eax + int a ;
int a1 = eax ;
eax = int a ;
eax = eax + int a1 ;
eax = eax + int a ;
int b = eax ;
eax = int a ;
eax = eax + int b ;
eax = eax + int a1 ;
eax = eax + int a ;
int c = eax ;
eax = int a ;
eax = eax + int c ;
eax = eax + int b ;
eax = eax + int c ;
int d = eax ;
eax = int a ;
eax = eax + int b ;
eax = eax + int a1 ;
int f = eax ;
```

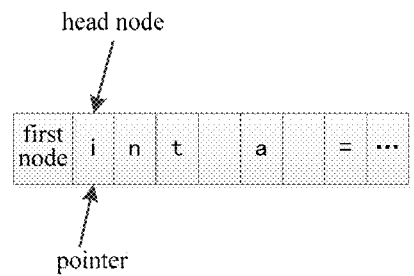
Fig. 4
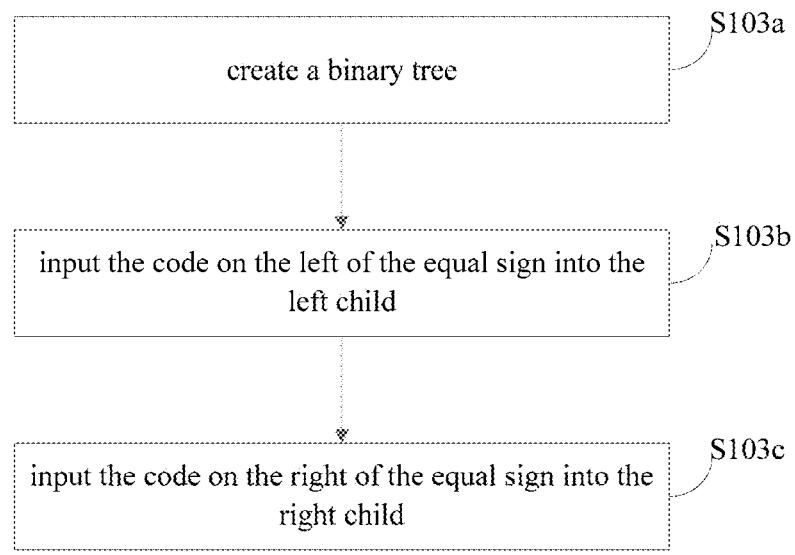
Fig. 5
```
int a = 1 ;
eax = int a ;
eax = eax + int a ;
eax = eax + int a ;
int a1 = eax ;
```
Fig. 6

METHOD AND SYSTEM FOR REGISTER CLEARING IN DATA FLOW ANALYSIS IN DECOMPILATION

This application is a National Stage application of PCT international application PCT/CN2012/085154, filed on Nov. 23, 2012 which claims priority to Chinese Patent Application No. 201210283230.4, entitled "METHOD AND SYSTEM FOR REGISTER CLEARING IN DATA FLOW ANALYSIS IN DECOMPILATION," filed with the Chinese State Intellectual Property Office on Aug. 10, 2012, which are both incorporated by reference in their entirety herein.

FIELD OF THE INVENTION

The invention relates to the technical field of decompilation, and in particular to a method and system for register clearing in data flow analysis in decompilation.

BACKGROUND OF THE INVENTION

Decompilation technique, as an indispensable part in reverse technique of computer, has been used in many fields such as system vulnerability analysis, software security and virus and trojan. The decompilation technique may be used to convert assembly language into high-level language (such as C language). Data flow analysis is important and difficult in the decompilation technique. Data flow analysis is a technique for collecting information of values calculated by a computer program at different points. Specifically, program control flow graph (CFG) may be used to determine assigning of a value to a variable may influence which part of the program.

Data flow analysis mainly includes two stages, i.e., a register clearing stage and a conditional code clearing stage. The existing register clearing stage is usually implemented by mapping two statements to each other and removing the overlapped register.

In such a method, the disk is read and written frequently, which spends a lot of time and reduces the execution efficiency.

SUMMARY OF THE INVENTION

To solve the above technical problems, a method and a system for register clearing in data flow analysis in decompilation are provided according to embodiments of the invention, for solving the problem of low execution efficiency of register clearing in the prior art. The technical solutions are as follows.

A method for register clearing in data flow analysis in decompilation includes:

opening a code file in assembly language before the register clearing, and reading all function statements in the code file;

performing judgment on each of the read function statements sequentially to judge whether the function statement includes a register name, and in a case that the function statement includes the register name, creating a binary tree and inputting the function statement into the binary tree; and performing judgment on each of the function statements including the register name sequentially to judge whether the function statement includes a right child end tag of the binary tree, and in a case that the function statement includes the right child end tag of the binary tree, performing an elimination process on the created binary tree to remove the register name from the binary tree, to generate a simplest binary tree, and generating a function statement in high-level language based on the simplest binary tree; and in a case that the function statement includes no right child end tag of the binary tree, continuing to judge whether a next function statement includes a register name.

Preferably, the register name may be EAX, AX, BX, CX, DX, SP, SI, BP or DI.

Preferably, the opening a code file in assembly language before the register clearing and reading all function statements in the code file may include:

opening the code file in assembly language before the register clearing;

creating a single linked list based on all function statements in the code file; and traversing the single linked list.

Preferably, in a case that the register name is EAX, the right child end tag of the binary tree may be "eax;".

Preferably, the creating a binary tree and inputting the function statement into the binary tree may include:

creating a binary tree;

inputting a code on the left of an equal sign in the function statement into a left child of the binary tree; and inputting a code on the right of the equal sign in the function statement into a right child of the binary tree.

Preferably, the performing an elimination process on the created binary tree to remove the register name from the binary tree, to generate a simplest binary tree may include:

replacing the register name in a right child of a node in a layer next to a top root node with a code in a right child of the top root node; and deleting the node in the layer next to the top root node.

A system for register clearing in data flow analysis in decompilation includes a reading unit, a register name judging unit, a binary tree creating unit, an end tag judging unit, an eliminating unit and a high-level language generating unit, the reading unit is adapted to open a code file in assembly language before the register clearing and read all function statements in the code file;

the register name judging unit is adapted to perform judgment on each of the read function statements sequentially to judge whether the function statement includes a register name, and to trigger the binary tree creating unit in a case that the function statement includes the register name;

the binary tree creating unit is adapted to create the binary tree and input the function statement into the binary tree;

the end tag judging unit is adapted to perform judgment on each of the function statements including the register name sequentially to judge whether the function statement includes a right child end tag of the binary tree; to trigger the eliminating unit in a case that the function statement includes the right child end tag of the binary tree; and to send a judging instruction to the register name judging unit to instruct the register name judging unit to continue to judge whether a next function statement includes a register name in a case that the function statement includes no right child end tag of the binary tree;

the eliminating unit is adapted to perform an elimination process on the created binary tree to remove the register name from the binary tree, to generate a simplest binary tree; and the high-level language generating unit is adapted to generate a function statement in high-level language based on the simplest binary tree.

Preferably, the reading unit may include a file opening unit, a single linked list creating subunit and a single linked list traversing subunit, the file opening subunit is adapted to open a code file in assembly language before the register clearing;

the single linked list creating subunit is adapted to create a single linked list based on all function statements in the code file; and the single linked list traversing subunit is adapted to traverse the single linked list.

Preferably, the binary tree creating unit may include a binary tree creating subunit, a left child subunit and a right child subunit, the binary tree creating subunit is adapted to create the binary tree;

the left child subunit is adapted to input a code on the left of an equal sign in the function statement into a left child of the binary tree; and the right child subunit is adapted to input a code on the right of the equal sign in the function statement into a right child of the binary tree.

Preferably, the eliminating unit may be adapted to:

replace the register name in a right child of a node in a layer next to a top root node with a code in a right child of the top root node; and delete the node in the layer next to the top root node.

From the above technical solutions, in the method and system for register clearing in data flow analysis in decompilation provided according to the present invention, all the function statements can be read at a time, and thus multiple reading and writing can be avoided. In addition, a binary tree is created based on the read function statements and an elimination process is performed on the binary tree, therefore, a function statement not including a register name can be obtained conveniently and quickly, which improves the execution efficiency.

BRIEF DESCRIPTION OF THE DRAWINGS

In order to illustrate the technical solutions according to the embodiments of the present invention or the prior art more clearly, drawings to be used in the description of the embodiments or the prior art will be described briefly hereinafter. Apparently, the drawings described hereinafter are only some embodiments of the present invention, and other drawings may be obtained by those skilled in the art according to these drawings without creative labor.

FIG. 4 is a schematic diagram of a single linked list for a method for register clearing in data flow analysis in decompilation according to an embodiment of the invention;

FIG. 5 is a schematic flow chart of yet another method for register clearing in data flow analysis in decompilation according to an embodiment of the invention;

FIG. 6 is a schematic diagram of an assembly language statement according to an embodiment of the invention;

DETAILED DESCRIPTION OF THE INVENTION

In order to make those skilled in the art better understand the technical solutions, the technical solutions according to the embodiments of the invention will be described clearly and completely in conjunction with the drawings in the embodiments of the invention. Apparently, the described embodiments are only part but not all of embodiments of the present invention. All other embodiments obtained by those skilled in the art based on these embodiments of the present invention without creative labor should fall within the scope of protection of the present invention.

Figure 1:
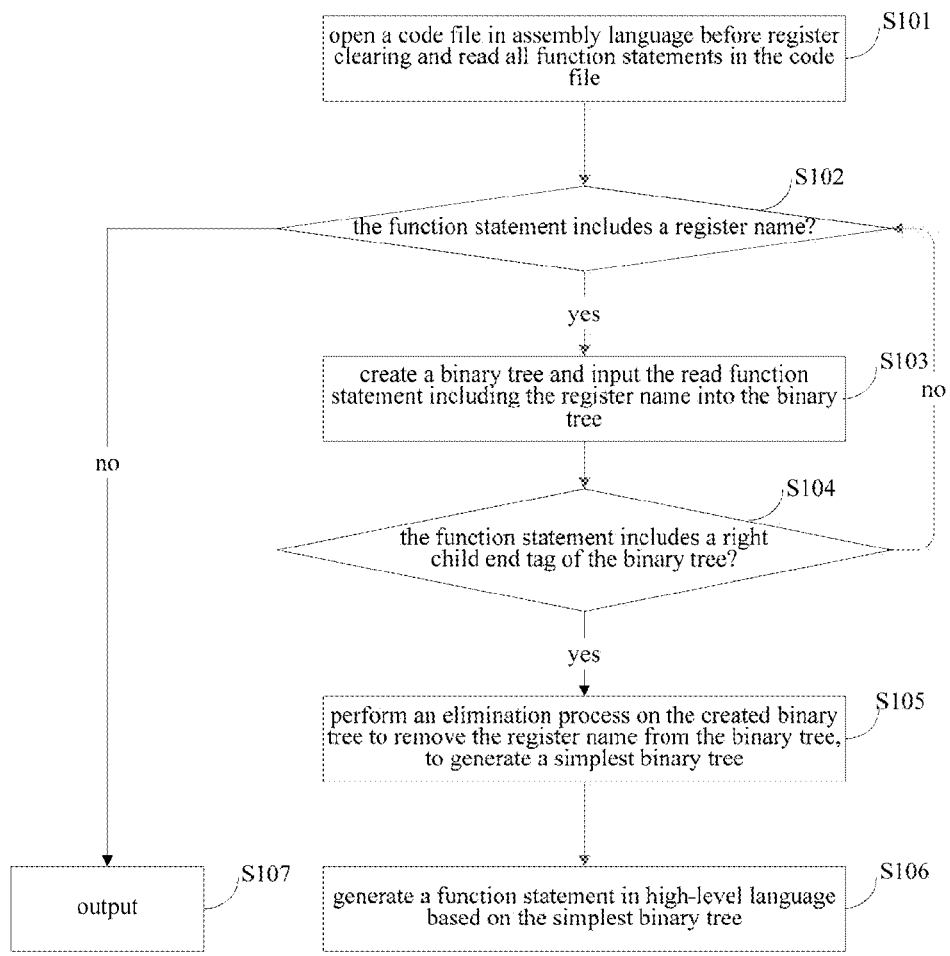
FIG. 1 is a schematic flow chart of a method for register clearing in data flow analysis in decompilation according to an embodiment of the invention.

As shown in FIG. 1, a method for register clearing in data flow analysis in decompilation according to an embodiment of the invention may include the following steps S101 to S107.

S101, opening a code file in assembly language before the register clearing, and reading all function statements in the code file.

Figures 2, 3:
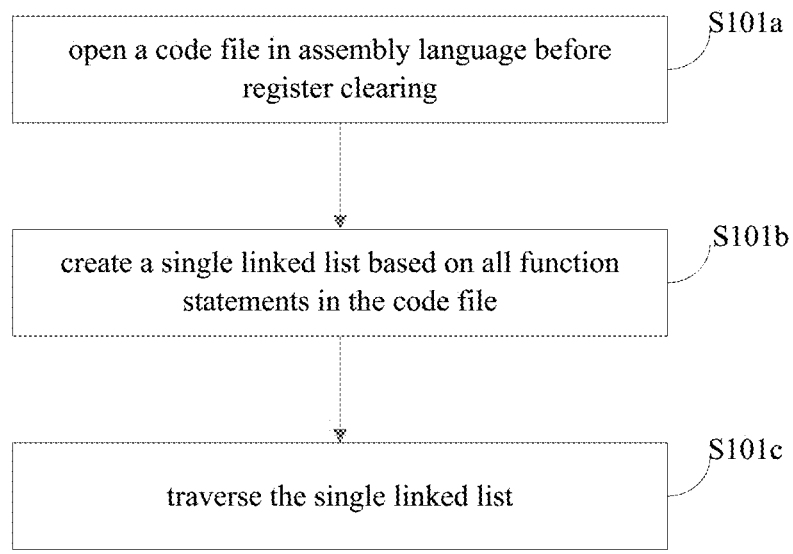
FIG. 2 is a schematic diagram of a function statement in assembly language according to an embodiment of the invention.
FIG. 3 is a schematic flow chart of another method for register clearing in data flow analysis in decompilation according to an embodiment of the invention.

The opened code file in assembly language before the register clearing may be as shown in FIG. 2. It can be understood that in the assembly language, ";" is used as a tag between function statements, and each ";" represents the end of a function statement. All the function statements in the code file may be read by one reading operation in the invention.

S102, performing judgment on each of the read function statements sequentially to judge whether the function statement includes a register name, proceeding to step S103 in a case that the function statement includes a register name, and proceeding to step S107 in a case that the function statement includes no register name.

The register name may be EAX, AX, BX, CX, DX, SP, SI, BP or DI. It is to be noted that EAX may be lower case "eax" in the assembly language and the high-level language.

Generally, in the John Von Neuman computer architecture, the register of the computer mainly includes, for example, AX, BX, CX, DX, SP, SI, BP and DI. The reading manner and the name of the register are different according to different bits such as low 8 bits, high 8 bits, 16 bits or 32 bits. In the assembly code, EAX for AX is mostly used and has iteration meaning. For example, a stack register is mainly used for retrieving system circumstance and the like. The name of the register is not limited in the present invention.

As shown in FIG. 2, in reading the function statement of the code file, it is found that the first function statement (int a=1;) includes no register name, then this function statement may be output directly without the register clearing.

S103, creating a binary tree and inputting the function statement into the binary tree.

In computer science, the binary tree is an ordered tree in which each node has at most two subtrees. The root of the subtree is generally referred to as a left subtree or a right subtree. Two subnodes of each node are respectively referred to as a left child and a right child.

In practical application, the code on the left of the equal sign in the function statement including the register name may be input into the left child of the binary tree; and the cod on the right of the equal sign in the function statement including the register name may be input into the right child of the binary tree.

Because multiple function statements are read, the binary tree may be created in the order of the function statements. For example, a binary tree with the height of 2 is created based on the first function statement including the register name, the codes on the left of the equal sign and on the right of the equal sign are input into the left child and the right child of the binary tree respectively, and the codes on the left of the equal sign and on the right of the equal sign in the second function statement including the register name are input into the left child and the right child of the above left child. The rest function statements are processed sequentially in the above manner, until a right child end tag of the binary tree is found in the function statement.

S104, performing judgment on the function statements including the register name sequentially to judge whether the function statement includes a right child end tag of the binary tree, proceeding to step S105 in a case that the function statement includes the right child end tag of the binary tree, and proceeding to step S102 in a case that the function statement includes no right child end tag of the binary tree.

Because it is uncertain which function statement includes a right child end tag of the binary tree, it may be determined, after step S103, whether each of the function statements including the register name includes a right child end tag of the binary tree sequentially.

The right child end tag of the binary tree may be "register name;", such as "eax;" or "BX;". In a case that the register name is eax, the right child end tag of the binary tree is "eax;".

S105, performing an elimination process on the created binary tree to remove the register name from the binary tree, to generate a simplest binary tree.

Specifically, the register name in the right child of a node in the layer next to the top root node may be replaced with the code in the right child of the top root node; and the nodes in the layer next to the top root node may be deleted.

S106, generating a function statement in high-level language based on the simplest binary tree.

In practical application, the code in the left child of the simplest binary tree may be placed on the left of the equal sign, and the code in the right child of the simplest binary tree may be placed on the right of the equal sign, and these codes together with the equal sign form the function statement in high-level language.

S107, performing an output process.

With the method for register clearing in data flow analysis in decompilation provided according to the embodiment of the invention, all the function statements can be read at a time, and thus multiple reading and writing can be avoided. In addition, a binary tree is created based on the read function statements and an elimination process is performed on the binary tree, therefore, a function statement including no register name can be obtained conveniently and quickly, which improves the execution efficiency.

As shown in FIG. 3, in another method for register clearing in data flow analysis in decompilation provided according to the embodiment of the invention, step S101 in the embodiment shown in FIG. 1 may include the following steps S101a to S101c.

S101a, opening the code file in assembly language before the register clearing.

S101b, creating a single linked list based on all function statements in the code file.

For the single linked list, data elements in the linear list may be stored in a set of storage units with random addresses. The node is represented by an element (mapping of the data element) and a pointer (which points the storage position of a next element). Compared with reading the function statement in the code file directly, the read order can be changed randomly by using the single linked list, which is more convenient.

S101c, traversing the single linked list.

For the first function statement "int a=1;" shown in FIG. 2, a single linked list as shown in FIG. 4 may be created. Each character in the single linked list occupies one node. "i" is the head node, and the pointer points to the head node "i". The single linked list includes a first node. A character matching operation may be performed while the pointer traverses the single linked list. If there is no "eax" before ";" by the traversing of the pointer, the traversed codes are output. As shown in FIG. 4, "int a=1;" are traversed, and "int a=1;" are output without register deleting.

As shown in FIG. 5, in yet another method for register clearing in data flow analysis in decompilation provided according to an embodiment of the invention, step S103 in the embodiment shown in FIG. 1 may include the following steps S103a to S103c.

S103a, creating the binary tree.

S103b, inputting the code on the left of the equal sign in the function statement into the left child of the binary tree.

S103c, inputting the code on the right of the equal sign in the function statement into the right child of the binary tree.

As shown in FIG. 6, the description is given below by taking part of the function statement shown in FIG. 2 as an example.

Figure 7:
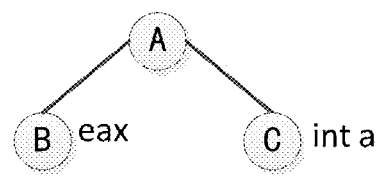
FIG. 7 is a schematic diagram of a binary tree according to an embodiment of the invention.

The first function statement "int a=1;" includes no register name, and thus an output process is performed directly. Then, it is judged that the second function statement includes the register name "eax", so the codes "eax" on the left of the equal sign are input into the left child of the binary tree (node B), and the codes "int a" on the right of the equal sign are input into the right child of the binary tree (node C), where the root node of the binary tree is node A. Therefore, the binary tree as shown in FIG. 7 is created, and the binary tree has a height of 2.

Figure 8:
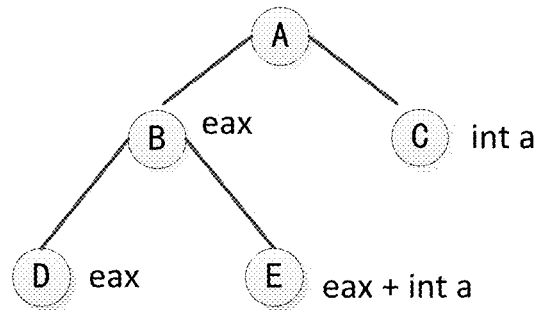
FIG. 8 is a schematic diagram of a binary tree according to an embodiment of the invention.

It is sequentially judged that the third function statement includes "eax", so "eax" is input into the left child of node B (node D) and "eax+int a" is input into the right child of node B (node E) similarly. Therefore, the binary tree as shown in FIG. 8 is created, and the binary tree has a height of 3.

Figure 9:
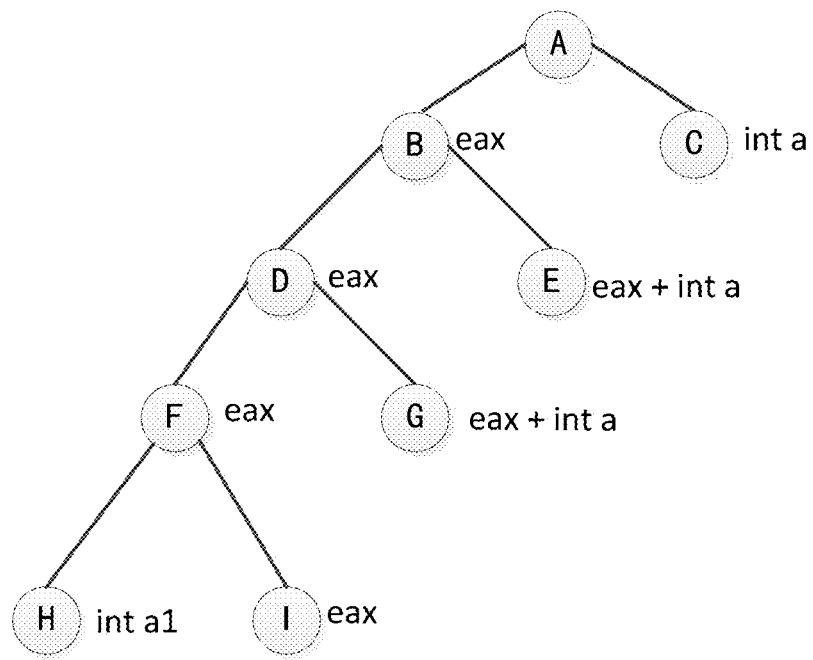
FIG. 9 is a schematic diagram of a binary tree according to an embodiment of the invention.

The binary tree is created continuously in a similar way as above, and the binary tree with a height of 5 as shown in FIG. 9 is finally created. Because the last one of the function statements shown in FIG. 6 includes the right child end tag of the binary tree "eax;", the creation of the binary tree is finished after this function statement is processed. A new binary tree may be created based on subsequent function statements.

After the binary tree is created, an elimination process needs to be performed on the created binary tree, to remove the register name from the binary tree. Preferably, step S105 in the embodiment shown in FIG. 1 may include:

replacing the register name in the right child of the node in the layer next to the top root node with the code in the right child of the top root node; and deleting the nodes in the layer next to the top root node.

The description will be given below by taking the created binary tree shown in FIG. 9 as an example.

Figure 10:
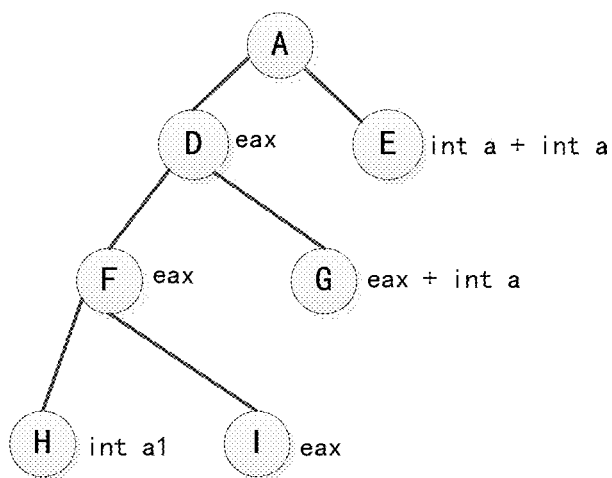
FIG. 10 is a schematic diagram of a binary tree according to an embodiment of the invention.

Firstly, from the top root node of the binary tree (node A) shown in FIG. 9, the code in the right child (node C) of node A is used to replace the register name "eax" in the right child (node E) in the next layer, and node B and node C in this layer are deleted, to form the binary tree as shown in FIG. 10. After that, the left child of the top root node becomes node D, and the right child of the top root node becomes node E.

Figure 11:
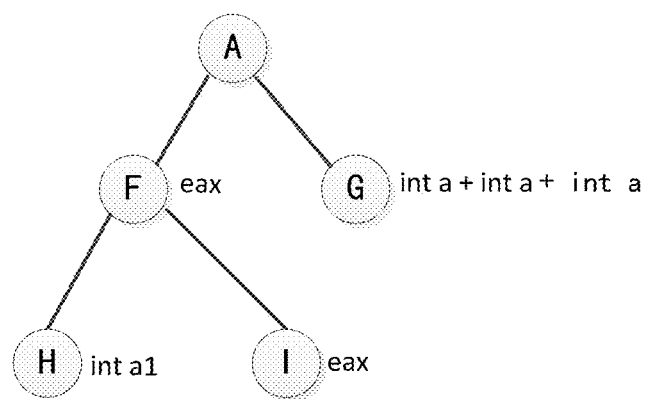
FIG. 11 is a schematic diagram of a binary tree according to an embodiment of the invention.

Next, the code in the right child (node E) of the top root node of the binary tree shown in FIG. 10 is used to replace the register name in the right child (node G) in the next layer, and node D and node E are deleted, to form the binary tree as shown in FIG. 11. After that, the left child of the top root node becomes node F, and the right child of the top root node becomes node G.

Figure 12:
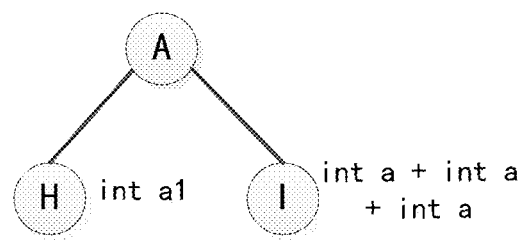
FIG. 12 is a schematic diagram of a binary tree according to an embodiment of the invention.

Finally, the code in the right child (node G) of the top root node of the binary tree shown in FIG. 11 is used to replace the register name in the right child (node I) in the next layer, and node F and node G are deleted, to form the binary tree as shown in FIG. 12. After that, the left child of the top root node becomes node H, and the right child of the top root node becomes node I. In this case, the height of the binary tree is 2, so the binary tree is the simplest binary tree, and no elimination process is needed.

Therefore, step S106 may be performed. Based on the simplest binary tree as shown in FIG. 12, the left child of the simplest binary tree is used as the code on the left of the equal sign of the function to be output, and the right child of the simplest binary tree is used as the code on the right of the equal sign of the function to be output, then the finally obtained function statement in high-level language to be output is: "int a1=int a+int a+int a;". It can be seen that no register name is included in the function statement in high-level language, and the register name has been removed successfully according to the present invention.

Corresponding to the method embodiment of the present invention, a system for register clearing in data flow analysis in decompilation is further provided according to the present invention.

Figure 13:
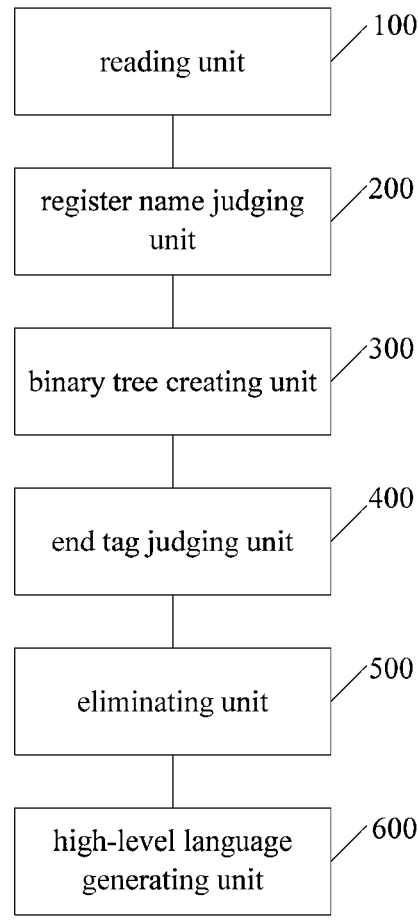
FIG. 13 is a schematic structure diagram of a system for register clearing in data flow analysis in decompilation according to an embodiment of the invention.

As shown in FIG. 13, a system for register clearing in data flow analysis in decompilation according to an embodiment of the invention may include a reading unit 100, a register name judging unit 200, a binary tree creating unit 300, an end tag judging unit 400, an eliminating unit 500 and a high-level language generating unit 600.

The reading unit 100 is adapted to open a code file in assembly language before the register clearing and read all function statements in the code file.

The opened code file in assembly language before the register clearing may be as shown in FIG. 2. It can be understood that ";" is used as a tag between function statements and each ";" represents the end of a function statement in the assembly language. In the invention, all function statements in the code file may be read by one reading operation.

The register name judging unit 200 is adapted to perform judgment on each of the read function statements sequentially to judge whether the function statement includes a register name, and to trigger the binary tree creating unit 300 in a case that the function statement includes a register name.

The register name may be EAX, AX, BX, CX, DX, SP, SI, BP or DI. It is to be noted that EAX may be lower case "eax" in the assembly language and the high-level language.

Generally, in the John Von Neuman computer architecture, the register of the computer mainly includes, for example, AX, BX, CX, DX, SP, SI, BP and DI. The reading manner and the name of the register are different according to different bits such as low 8 bits, high 8 bits, 16 bits or 32 bits. In the assembly code, EAX for AX is mostly used and has iteration meaning. For example, a stack register is mainly used for retrieving system circumstance and the like. The name of the register is not limited in the present invention.

As shown in FIG. 2, in reading the function statement of the code file, it is found that the first statement (int a=1;) includes no register name, then this function statement may be output directly without the register clearing.

The binary tree creating unit 300 is adapted to create a binary tree and input the function statement into the binary tree.

In computer science, the binary tree is an ordered tree in which each node has at most two subtrees. The root of the subtree is generally referred to as a left subtree or a right subtree. Two subnodes of each node are respectively referred to as a left child and a right child.

In practical application, the code on the left of the equal sign in the function statement including the register name may be input into the left child of the binary tree; and the cod on the right of the equal sign in the function statement including the register name may be input into the right child of the binary tree.

Because multiple function statements are read, the binary tree may be created in the order of the function statements. For example, a binary tree with the height of 2 is created based on the first function statement including the register name, the codes on the left of the equal sign and on the right of the equal sign are input into the left child and the right child of the binary tree respectively, and the codes on the left of the equal sign and on the right of the equal sign in the second function statement including the register name are input into the left child and the right child of the above left child. The rest function statements are processed sequentially in the above manner, until a right child end tag of the binary tree right is found in the function statement.

The end tag judging unit 400 is adapted to perform judgment on each of the function statements including the register name sequentially to judge whether the function statement includes a right child end tag of the binary tree; to trigger the eliminating unit 500 in a case that the function statement includes the right child end tag of the binary tree; and to send a judging instruction to the register name judging unit 200 to instruct the register name judging unit 200 to judge whether a next function statement includes the register name in a case that the function statement includes no right child end tag of the binary tree.

The right child end tag of the binary tree may be "register name;" such as "eax;" or "BX;". In a case that the register name is eax, the right child end tag of the binary tree is "eax;".

The eliminating unit 500 is adapted to perform an elimination process on the created binary tree to remove the register name from the binary tree, to generate a simplest binary tree.

The register name in the right child of a node in a layer next to the top root node may be replaced with the code in the right child of the top root node; and the nodes in the layer next to the top root node may be deleted.

The high-level language generating unit 600 is adapted to generate a function statement in high-level language based on the simplest binary tree.

In practical application, the code in the left child of the simplest binary tree may be placed on the left of the equal sign, and the code in the right child of the simplest binary tree may be placed on the right of the equal sign, and these codes together with the equal sign form the function statement in high-level language.

It can be understood that an output process may be performed on the generated function statement in high-level language.

With the system for register clearing in data flow analysis in decompilation provided according to the embodiment of the invention, all the function statements can be read at a time, and thus multiple reading and writing can be avoided. In addition, a binary tree is created based on the read function statements and an elimination process is performed on the binary tree, therefore, a function statement including no register name can be obtained conveniently and quickly, which improves the execution efficiency.

Figure 14:
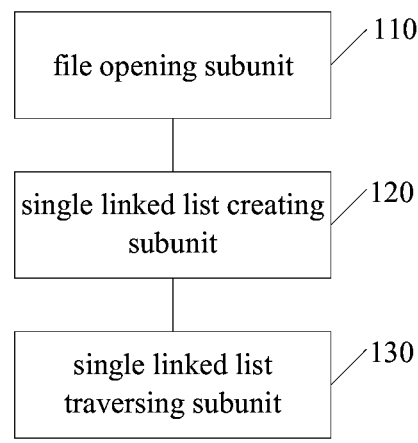
FIG. 14 is a schematic structure diagram of another system for register clearing in data flow analysis in decompilation according to an embodiment of the invention.

As shown in FIG. 14, in another system for register clearing in data flow analysis in decompilation provided according to an embodiment of the invention, the reading unit 100 may include a file opening unit 110, a single linked list creating subunit 120 and a single linked list traversing subunit 130.

The file opening subunit 110 is adapted to open a code file in assembly language before the register clearing.

The single linked list creating subunit 120 is adapted to create a single linked list based on all function statements in the code file.

For the single linked list, data elements in the linear list may be stored in a set of storage units with random addresses. The node is represented by an element (mapping of the data element) and a pointer (which points the storage position of a next element). Compared with reading the function statement in the code file directly, the read order can be changed randomly by using the single linked list, which is more convenient.

The single linked list traversing subunit 130 is adapted to traverse the single linked list.

For the first function statement "int a=1;" shown in FIG. 2, a single linked list as shown in FIG. 4 may be created. Each character in the single linked list occupies one node. "i" is the head node, and the pointer points to the head node "i". The single linked list includes a first node. A character matching operation may be performed while the pointer traverses the single linked list. If there is no "eax" before ";" by the traversing of the pointer, the traversed codes are output. As shown in FIG. 4, "int a=1;" are traversed, and "int a=1;" are output without register deleting.

Figure 15:
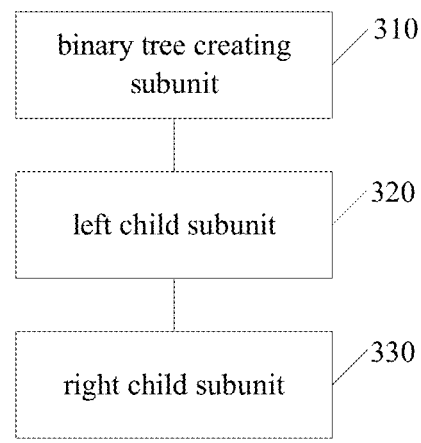
FIG. 15 is a schematic structure diagram of yet another system for register clearing in data flow analysis in decompilation according to an embodiment of the invention.

As shown in FIG. 15, in another system for register clearing in data flow analysis in decompilation provided according to an embodiment of the invention, the binary tree creating unit 300 may include a binary tree creating subunit 310, a left child subunit 320 and a right child subunit 330.

The binary tree creating subunit 310 is adapted to create a binary tree.

The left child subunit 320 is adapted to input the code on the left of the equal sign in the function statement into the left child of the binary tree.

The right child subunit 330 is adapted to input the code on the right of the equal sign in the function statement into the right child in the binary tree.

As shown in FIG. 6, the description is given below by taking part of the function statement shown in FIG. 2 as an example.

The first function statement "int a=1;" includes no register name, and thus an output process is performed directly. Then, it is judged that the second function statement includes the register name "eax", so the codes "eax" on the left of the equal sign are input into the left child of the binary tree (node B), and the codes "int a" on the right of the equal sign are input into the right child of the binary tree (node C), where the root node of the binary tree is node A. Therefore, the binary tree as shown in FIG. 7 is created, and the binary tree has a height of 2.

It is sequentially judged that the third function statement includes "eax", so "eax" is input into the left child of node B (node D) and "eax+int a" is input into the right child of node B (node E) similarly. Therefore, the binary tree as shown in FIG. 8 is created, and the binary tree has a height of 3.

The binary tree is created continuously in a similar way as above, and the binary tree with a height of 5 as shown in FIG. 9 is finally created. Because the last one of the function statements shown in FIG. 6 includes the right child end tag of the binary tree "eax;", the creation of the binary tree is finished after this function statement is processed. A new binary tree may be created based on subsequent function statements.

After the binary tree is created, an elimination process needs to be performed on the created binary tree, to remove the register name from the binary tree. Preferably, the eliminating unit 500 may be adapted to:

replace the register name in the right child of the node in the layer next to the top root node with the code in the right child of the top root node; and delete the nodes in the layer next to the top root node.

The description will be given below by taking the created binary tree shown in FIG. 9 as an example.

Firstly, from the top root node of the binary tree (node A) shown in FIG. 9, the code in the right child (node C) of node A is used to replace the register name "eax" in the right child (node E) in the next layer, and node B and node C in this layer are deleted, to form the binary tree as shown in FIG. 10. After that, the left child of the top root node becomes node D, and the right child of the top root node becomes node E.

Next, the code in the right child (node E) of the top root node of the binary tree shown in FIG. 10 is used to replace the register name in the right child (node G) in the next layer, and node D and node E are deleted, to form the binary tree as shown in FIG. 11. After that, the left child of the top root node becomes node F, and the right child of the top root node becomes node G.

Finally, the code in the right child (node G) of the top root node of the binary tree shown in FIG. 11 is used to replace the register name in the right child (node I) in the next layer, and node F and node G are deleted, to form the binary tree as shown in FIG. 12. After that, the left child of the top root node becomes node H, and the right child of the top root node becomes node I. In this case, the height of the binary tree is 2, so the binary tree is the simplest binary tree, and no elimination process is needed.

Then, the high-level language generating unit 600 may be triggered. Based on the simplest binary tree as shown in FIG. 12, the left child of the simplest binary tree is used as the code on the left of the equal sign of the function to be output, and the right child of the simplest binary tree is used as the code on the right of the equal sign of the function to be output, then the finally obtained function statement in high-level language to be output is: "int a1=int a+int a+int a;". It can be seen that no register name is included in the function statement in high-level language, and the register name has been removed successfully according to the present invention.

For convenience of description, various units are described according to function in describing the above device. Functions of the various units may be implemented in one or multiple software and/or hardware in implementing the present invention.

From the above description of the embodiments, those skilled in the art known that the present invention may be implemented by means of software and necessary general-purpose hardware platform. Therefore, the part of the technical solution of the present invention that is essential or contributes to the prior art may be embodied in software product, and the computer software product may be stored in storage medium such as ROM/RAM, magnetic disk, optical disk, and may include several instructions adapted to cause a computer device (such as a personal computer, a server or a network device) to implement the method of all or part of the embodiment of the present invention.

The embodiments are described in a progressive manner in the present specification, each embodiment mainly focuses on the difference from other embodiment, and the same or similar part of one embodiment may refer to that of other embodiment. The device embodiment is similar to the method embodiment and thus is described simply, and the related part of the device embodiment may refer to that of the method embodiment. The system embodiments described above are illustrative, where the units that are described as separate components may be or may not be separate physically, and the component illustrated as a unit may be or may not be a physical unit, i.e., may be located at a place, or may be distributed at multiple network units. Some or all of the modules in the present invention may be selected as required to achieve the purpose of the solution of the embodiment. All of the above can be understood and implemented by those skilled in the art without creative labor.

The present invention may be applied to many general-purpose or dedicated computing system circumstances or configurations, such as personal computer, server computer, handheld device or portable device, tablet device, multi-processor system, microprocessor based system, set top box, programmable consumer electronic device, network PC, mini computer, large computer and distributed computing circumstance including any of the above systems or devices.

The present invention may be embodied in general context of a computer executable instruction that is executed by a computer, such as a program module. Generally, the program module includes, for example, a routine, a program, an object, a component and a data structure which are adapted to carried out a specific task or achieve a specific abstract data type. The present invention may also be implemented in distributed computing circumstance, in which the task is carried out by a remote processing device connected via a communication network. In the distributed computing circumstance, the program module may be located in the local and remote computer storage medium including the storage device.

It should be noted that in the present invention, relation terms such as "first" and "second" are used only to distinguish one entity or operation from another entity or operation, but not necessarily to demand or indicate actual relations or orders among these entities and operations.

The above are only embodiments of the present invention. It should be noted that many modifications and alternations may be made by those ordinary skilled in the art without deviating from the principle of the present invention, and these modifications and alternations also fall within the scope of protection of the present invention.

The invention claimed is:

1. A method for register clearing in data flow analysis in decompilation, comprising:
   opening a code file in assembly language before the register clearing, and reading all function statements in the code file;
   performing judgment on each of the read function statements sequentially to judge whether the function statement comprises a register name, and in a case that the function statement comprises the register name, creating a binary tree and inputting the function statement into the binary tree; and
   performing judgment on each of the function statements comprising the register name sequentially to judge whether the function statement comprises a right child end tag of the binary tree, and
   in a case that the function statement comprises the right child end tag of the binary tree, performing an elimination process on the created binary tree to remove the register name from the binary tree, to generate a simplest binary tree, and generating a function statement in high-level language based on the simplest binary tree; and
   in a case that the function statement comprises no right child end tag of the binary tree, judging whether a next function statement comprises a register name.

2. The method according to claim 1, wherein the register name is EAX, AX, BX, CX, DX, SP, SI, BP or DI.

3. The method according to claim 1, wherein the opening a code file in assembly language before the register clearing and reading all function statements in the code file comprises:
   opening the code file in assembly language before the register clearing;
   creating a single linked list based on all function statements in the code file; and
   traversing the single linked list.

4. The method according to claim 1, wherein in a case that the register name is EAX, the right child end tag of the binary tree is "eax;".

5. The method according to claim 1, wherein the creating a binary tree and inputting the function statement into the binary tree comprises:
   creating the binary tree;
   inputting a code on the left of an equal sign in the function statement into a left child of the binary tree; and
   inputting a code on the right of the equal sign in the function statement into a right child of the binary tree.

6. The method according to claim 1, wherein the performing an elimination process on the created binary tree to remove the register name from the binary tree, to generate a simplest binary tree comprises:
   replacing a register name in a right child of a node in a layer next to a top root node with a code in a right child of the top root node; and
   deleting the node in the layer next to the top root node.

7. A system for register clearing in data flow analysis in decompilation, comprising a processor and a non-transitory storage medium accessible to the processor, the non-transitory storage medium being configured to store units comprising a reading unit, a register name judging unit, a binary tree creating unit, an end tag judging unit, an eliminating unit and a high-level language generating unit, wherein
   the reading unit is adapted to open a code file in assembly language before the register clearing, and to read all function statements in the code file;
   the register name judging unit is adapted to perform judgment on each of the read function statements sequentially to judge whether the function statement comprises a register name, and to trigger the binary tree creating unit in a case that the function statement comprises the register name;
   the binary tree creating unit is adapted to create a binary tree and input the function statement into the binary tree;
   the end tag judging unit is adapted to perform judgment on each of the function statements comprising the register name sequentially to judge whether the function statement comprises a right child end tag of the binary tree; to trigger the eliminating unit in a case that the function statement comprises the right child end tag of the binary tree; and to send a judging instruction to the register name judging unit to instruct the register name judging unit to judge whether a next function statement comprises a register name in a case that the function statement comprises no right child end tag of the binary tree;

the eliminating unit is adapted to perform an elimination process on the created binary tree to remove the register name from the binary tree, to generate a simplest binary tree; and the high-level language generating unit is adapted to generate a function statement in high-level language based on the simplest binary tree.

8. The system according to claim 7, wherein the reading unit comprises a file opening subunit, a single linked list creating subunit and a single linked list traversing subunit, the file opening subunit is adapted to open the code file in assembly language before the register clearing;

the single linked list creating subunit is adapted to create a single linked list based on all function statements in the code file; and the single linked list traversing subunit is adapted to traverse the single linked list.

9. The system according to claim 7, wherein the binary tree creating unit comprises a binary tree creating subunit, a left child subunit and a right child subunit, the binary tree creating subunit is adapted to create the binary tree;

the left child subunit is adapted to input a code on the left of an equal sign in the function statement into a left child of the binary tree; and the right child subunit is adapted to input a code on the right of the equal sign in the function statement into a right child of the binary tree.

10. The system according to claim 7, wherein the eliminating unit is adapted to replace the register name in a right child of a node in a layer next to a top root node with a code in a right child of the top root node; and delete the node in the layer next to the top root node.

11. The method according to claim 2, wherein the opening a code file in assembly language before the register clearing and reading all function statements in the code file comprises:

opening the code file in assembly language before the register clearing;

creating a single linked list based on all function statements in the code file; and traversing the single linked list.

\* \* \* \* \*